United States Patent [19]
Still

[11] 3,926,356
[45] Dec. 16, 1975

[54] INSERTS
[75] Inventor: Leslie Ernest Still, Wolverhampton, England
[73] Assignee: The Precision Screw & Manufacturing Company Limited, Willenhall, England
[22] Filed: June 24, 1974
[21] Appl. No.: 482,375

[30] Foreign Application Priority Data
July 19, 1973 United Kingdom............... 34443/73

[52] U.S. Cl. ................. 227/114; 227/156; 227/149
[51] Int. Cl.² .......................................... B27F 7/02
[58] Field of Search ........... 227/114, 116, 120, 156, 227/149

[56] References Cited
UNITED STATES PATENTS

| | | | |
|---|---|---|---|
| 753,281 | 3/1904 | Maenche | 227/116 |
| 1,125,411 | 1/1915 | Szemerey | 227/114 |
| 1,506,788 | 9/1924 | Stimpson | 227/116 |
| 2,343,982 | 3/1944 | Knowlton | 227/156 X |
| 2,747,185 | 5/1956 | Effgen | 227/156 X |
| 2,989,750 | 6/1961 | McIlvin | 227/114 X |

*Primary Examiner*—Granville Y. Custer, Jr.
*Attorney, Agent, or Firm*—Marshall & Yeasting

[57] ABSTRACT

Apparatus for installing inserts into a thermoplastic workpiece comprises a reciprocable mandrel for displacing the inserts individually from a supply thereof towards and into a bore in the workpiece which is supported on a support bed of the apparatus. The inserts are accommodated within a shoe of thermal conducting material through which the mandrel passes and the shoe is connected to a heater device so that the inserts are heated both prior to, and during, engagement with the mandrel. To prolong the length of time for heating the inserts, the shoe is coupled with the mandrel for movement towards the workpiece.

6 Claims, 4 Drawing Figures

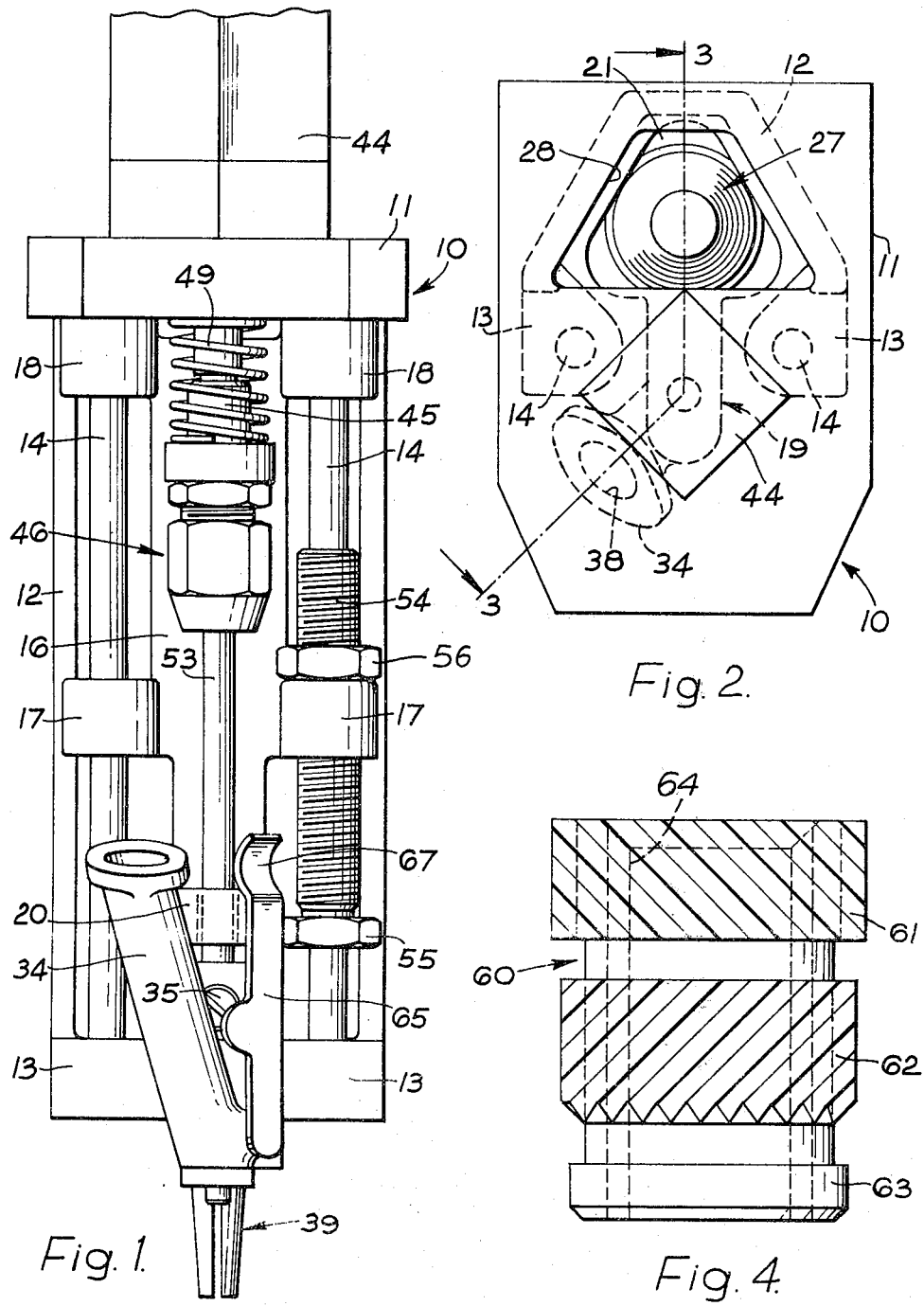

INSERTS

BACKGROUND OF THE INVENTION

This invention relates to apparatus for installing inserts into a thermoplastic material wherein the inserts are heated to cause localised flow of the thermoplastic material thereby enabling the thermoplastic material to conform to the external configuration of the insert.

In known apparatus disclosed in West German Pat. No. 1,925,766, inserts to be installed are supplied to a shoe which defines a channel for reception and guidance of the inserts into the path of movement of a mandrel for displacing the inserts individually out of the shoe and into the workpiece. This apparatus includes a heating coil in thermal conducting relation with the mandrel whereby heat is transmitted to the inserts through the agency of the mandrel.

This apparatus is subject to a number of drawbacks. For example, because heat is inparted to the inserts primarily through the agency of the mandrel, the mandrel must be allowed to contact the insert for a certain length of time to achieve the required insertion temperature; the speed of the mandrel is governed by this factor and consequently the rate at which each oprational cycle may be executed is limited. Also, the shoe is fixed and for a certain part of each stroke of the mandrel, the insert carried thereby will be exposed to the surroundings will consequent loss of heat by radiation.

SUMMARY OF THE INVENTION

The object of the present invention is to provide an improved apparatus for installing inserts into thermoplastic workpieces.

According to the invention, apparatus for installing inserts into a thermoplastic workpiece comprises a shoe provided with a passage for receiving inserts in succession, heating means in thermal conducting relation with said shoe to heat the same and hence the inserts therein, and means for displacing inserts individually out of the shoe and into a workpiece, said heating means and said shoe being so arranged that the inserts are heated within the shoe primarily by heat transmission through the shoe.

The shoe effectively provides a heat sink, so that heat accumulates in the shoe during the interval when one insert has been displaced from the shoe into the material and prior to the delivery of the next insert to the shoe, and preferably the shoe is arranged to be displaceable with the insert from a loading station to a position close to the workpiece so that heat transfer can take place to the insert over the maximum portion of each operational cycle which comprises the installation of a single insert.

Moreover, the shoe is preferably provided with a straight bore for receiving the insert and through which the insert is displaced for insertion into the workpiece, and this enables substantially the entire external surface area of the insert to be used for heat transfer from the shoe.

Preferably an apparatus in accordance with the present invention comprises means for feeding the inserts in succession and in correct alignment, and a sub-frame supported by the said shoe and having an inclined bore, the axis of which intersects with the main bore through which the inserts are moved, the shoe also having a bore for receiving the electrically heated tip, thus allowing a conventional heating tool analogous to an electric soldering iron to be employed in this apparatus.

The straight axial bore through which the inserts are fed may be provided with a spring clip means in the form of, for example, a collet causing an insert to be firmly gripped for good heat transfer from the shoe via the spring clip, or alternatively detent means may be provided so as to prevent overtravel of an insert through the bore in the loading station and requiring certain axial pressure before being overcome to allow continued travel of the insert through the bore and out of the same and into the workpiece.

Preferably the means for displacing the insert comprises a plunger operable under a predetermined load which may be insufficient to enable an insert to be formed into a workpiece, but which load is sufficient to enable the insertion to take place providing the plastics of the workpiece has softened to a predetermined required extent.

BRIEF DESCRIPTION OF THE DRAWINGS

FIG. 1 is a front view of apparatus in accordance with the invention;

FIG. 2 is a plan view of the apparatus of FIG. 1;

FIG. 4 is a view of one form of fastener which may be inserted into a thermoplastic workpiece by the apparatus of FIGS. 1 to 3.

DESCRIPTION OF THE PREFERRED EMBODIMENT

Figure 3:
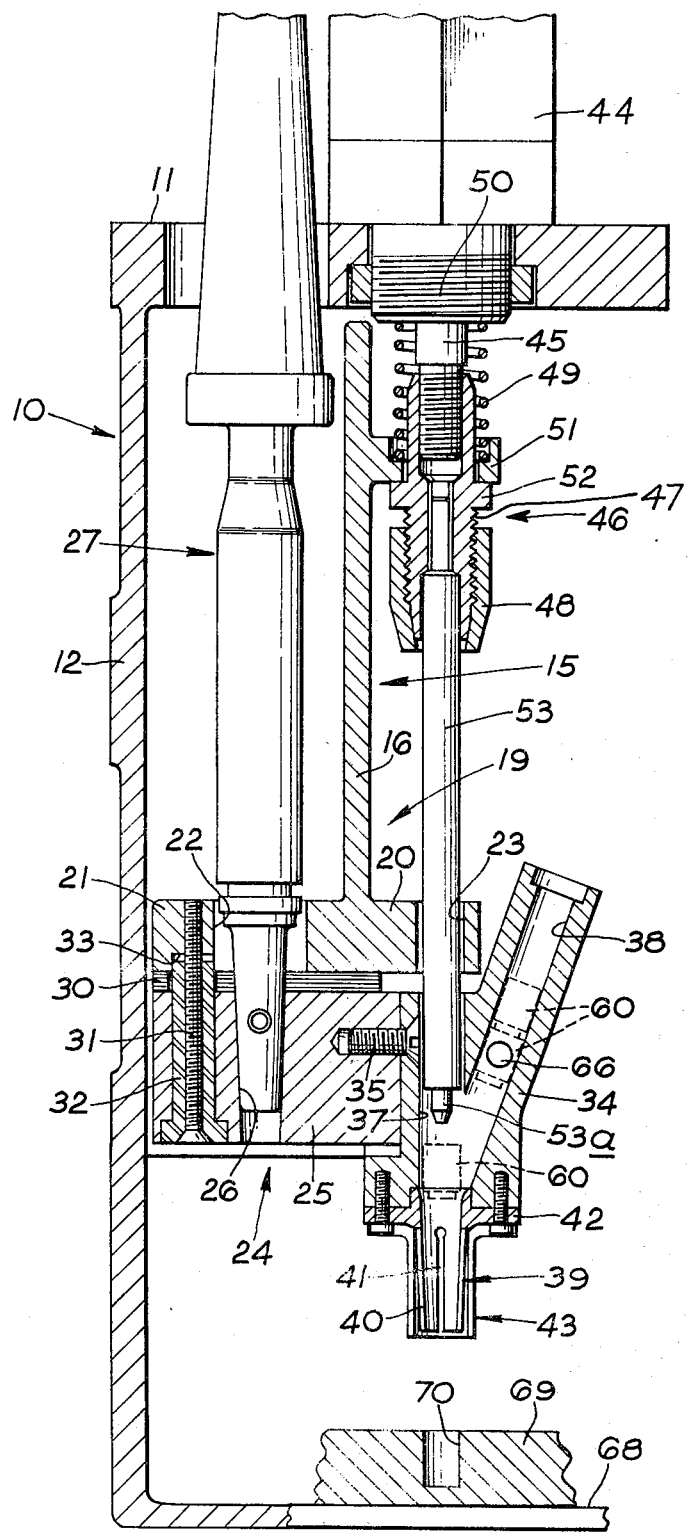
FIG. 3 is a sectional view taken on the line 3 — 3 in FIG. 2.

Referring to FIGS. 1 to 3, the apparatus comprises a main fixed structure 10 which may, for example, be in the form of an aluminium casting. The structure 10 comprises a top plate 11 and a column 12 of generally U-shaped configuration in transverse section which terminates in foot portions 13 at the base thereof. Between the foot portions 13 and the top plate 11 there extends a pair of spaced parallel guide rods 14 (not shown in FIG. 3) which slidably mount a slide member 15 for movement lengthwise of the rods 14. The slide member 15 comprises a centrally disposed column 16 formed with vertically-spaced pairs of apertured lugs 17, 18 which embrace the guide rods 14, and a base 19 comprising a forwardly projecting arm 20 and a rearwardly projecting portion 21 of generally triangular configuration conforming with the internal configuration of the column 12. The triangular portion 21 is formed with an aperture 22 and the arm 20 is formed with an aperture 23.

Beneath the base 19, there is mounted an assembly 24 of parts, hereinafter called the shoe, composed of material of high thermal conductivity. The shoe 24 includes a first section 25 of generally complementary configuration to the base 19 and having a downwardly tapering through bore 26 aligned with the aperture 22 in the portion 21. The through bore 26 receives the tip of, and serves to support, a thermostatically-controlled electrical heating device 27 which extends vertically upwards and passes with clearance through the aperture 22 and an aperture 28 in the top plate 11. A layer 30 of thermally insulating material is interposed between the section 25 and the base 19 to thermally isolate the base 19 from thermal conducting relation with the tip of the device 27. The section 25 and the base 19 are secured together at their apices by fasteners 31 which are sheathed by bushes 32 of thermally insulating material. The upper ends of the bushes engage within recesses 33 in the underside of the base 19 to accurately locate the base 19 and section 25 relative to one another, The shoe 24 includes a second section 34 which is releasably secured to the first section 25 by a fastener 35 such as a screw so as to be in good thermal conducting relation therewith. In this context, it will be noted that the two sections have large contact areas. The section 34 is formed with a vertical through bore 37, aligned with the aperture 23 in the arm 20, and a bore 38 inclined relative to the through bore 37 and merging therewith adjacent the lower end of the section 34.

The converging bores 37 and 38 have a continuation provided by a collet 39 which also forms part of the shoe 24. The collet 39 comprises a tapering body 40 of round section having one or more axially-extending slits 41 in the wall thereof; for example, two diametrically-opposite slits may be provided. The mouth of the body 40 is radiussed to provide a smooth contour at the junction with the bores 37 and 38 and the collet 39 includes a large radial flange 42 whereby the collet is fastened to the section 34 so as to have appreciable surface contact therewith. The collet 39 is composed of a high thermal conductivity metal having some degree of resilience so that the collet 39 may be expanded radially and allowed to restore elastically. The collet 39 is conveniently enclosed within a shield 43 of uniform bore size (see FIG. 3) the lower end of which terminates slightly below the tip of the collet 39. The shield 43 may be composed of a thermally insulating material.

The top plate 11 mounts a double-acting piston and cylinder unit, the cylinder 44 being secured to the upper side of the plate 11 with the piston rod 45 passing through an aperture in the plate 11. The piston rod 45 mounts a chuck assembly 46 comprising a body 47 and a sleeve 48. A compression spring 49 acts between an enlarged portion 50 of the piston rod 45 and a forwardly-projecting arm 51 of the column 16 through which the chuck body 47 passes freely. Beneath the arm 51, the chuck body 47 is formed with an annular shoulder 52 for abutment with the arm 51.

As shown, the chuck 46 mounts a mandrel 53 which passes through the aperture 23 and extends into the through bore 37 in the shoe section 34. The lower end of the mandrel 53 terminates in a nose portion 53a of reduced diameter. The diameter of the mandrel 53 is greater than that of the collet body 40 adjacent the tip thereof. When fluid under pressure is supplied alternately to opposite ends of the cylinder 44, the piston rod 45 and the mandrel 53 are caused to reciprocate between the position shown in FIGS. 1 and 2 and a lower position (not illustrated). As the piston rod 45 moves downwardly, it will be seen that downward movement will also be imparted to the slide member 15, and hence heating device 27 and the shoe 24, through the agency of the spring 49. The extent of such movement of the slide member 15 is adjustable for reasons explained hereinafter, and for the purpose of adjustment one of the lugs 17 is threadedly coupled with an externally-threaded sleeve 54 through which the respective rod 14 passes. The lower end of the sleeve 54 is formed with a hexagonal stop 55 whose vertical disposition relative to the foot portion 13 therebelow may be adjusted by rotation of the sleeve 54. A locknut 56 is provided to secure the sleeve 54 in a selected position of adjustment.

From the foregoing, it will be seen that downward movement of the slide member 15 and hence the shoe 24 is governed by the position of the stop 55 relative to the foot portion 13. Such downward movement is terminated when the stop 55 contacts the foot portion 13; however the piston rod 45 and the mandrel 53 are free to continue moving downwardly whereby the mandrel 53 may pass along the through bore 37 and into the collet 39. Upon upward displacement of the piston rod 45, the slide member is drawn upwardly by contact between the shoulder 52 and the arm 51.

Before use of the apparatus is described, reference is now made to FIG. 4 showing a typical example of an insert to be inserted into a thermoplastic workpiece. As shown the insert comprises a generally cylindrical bush 60 having internal threads 64, which is formed with two axially spaced opposite handed sets 61, 62 of helical splines and has a pilot portion 63. The major diameter and root diameter of the splines may, if desired, be greater for set 61 than for set 62. The insert is normally inserted pilot portion first into a preformed blind bore in the workpiece, the bore diameter being approximately equal to that of the bush 60 so that the splines of the insert, when installed, will embed into the walls of the preformed bore.

Such inserts are supplied to the apparatus described via the bore 38 and are caused to fall one by one into the path of movement of the mandrel 53. Thus, as shown one insert 60 is located at the mouth of the collet 39 and a series of inserts 60 accommodated within the bore 38 (two only are shown). In use the bore 38 is connected to a vibratory bowl feeder of known kind in which inserts are fed in succession along a flexible pipe or conduit, the bore 38 being connected to the pipe. The diameter of the bore 38 is shown so that the inserts 60 are a close fit therein whereby the inserts arriving in the bore 38 may be heated by the heating device through the agency of the shoe sections 25 and 34.

In order to release the inserts 60 one by one for movement into the path of the mandrel, a catch member 65 is provided which has a projection passing through a hole 66 in the wall of the bore 38 for engagement with the leading insert. The catch member 65 is formed with an upper cam portion 67 co-operable with the sleeve 48 of the chuck 46 in such a way that when the mandrel 53 has covered the bore 38, the catch member 65 is displaced outwardly thereby releasing the leading insert and allowing it to fall into abutment with the side of the mandrel 53 where it stays until the mandrel is retracted upwardly, at which time the catch member 65 is released to engage the next successive insert and the leading insert is free to fall pilot portion first into the mouth of the collet 39.

The apparatus includes a workpiece support bed, designated by reference numeral 68 in FIG. 3, on which a workpiece 69 may be fixedly located with a blind bore 70 therein aligned co-axially with the body 40 of the collet 39. In use, the hexagonal head 55 of the sleeve 54 is adjusted so that, during downward movement of the mandrel 53, the slide member 15 is brought to rest in a position wherein the tip of the collet 39 is located in close proximity to the workpiece whereby continued downward movement of the mandrel 53 is effective to displace the insert 60 through the collet 39 and into the bore 70, against the resistance offered by the collet. Guidance for the insert 60 during such displacement is provided by the nose portion 53a which is of a diameter substantially equal to the internal diameter of the insert 60. Of course, when the inserts are of the kind having an externally screw-threaded stud-like projection instead of an internally-threaded bore, the mandrel 53 may be modified so as to have a cavity in the lower end thereof for reception of the stud.

It will be noted from the foregoing that the inserts are heated throughout their passage through the shoe 24 and that such heating is maintained during advance of the individual inserts towards the workpiece, heat being supplied to the inserts from the device 27 primarily through the agency of the shoe 24. Also the mandrel 53 is heated through the agency of the shoe 24 and consequently there will be no substantial temperature differential between the mandrel 53 and the inserts. A feature of the apparatus is that the shoe section 34 is readily detachable from the section 25 thereby permitting interchange with a shoe section having smaller diameter bores 37 and 38 whereby smaller diameter inserts may be accommodated without loss in efficiency of heat transfer to the inserts. Likewise the mandrel 53 may be readily replaced by one having an appropriate diameter and nose portion.

It has been found that for many applications, a shoe temperature of the order of 600° to 800°C may be appropriate and allows approximately a three second cycle.

I claim:

1. Apparatus for installing metallic inserts into a thermoplastic workpiece, comprising a fixed workpiece support bed, a fixed supporting frame, a mandrel reciprocably mounted on the frame, having a tip shaped to fit and carry an insert to be driven thereby, an insert-receiving member reciprocably mounted on the frame, having a passage which is open at both ends and is axially aligned with the mandrel, means for supplying inserts one at a time to said passage, means for heating the insert-receiving member to transmit heat therefrom to the inserts, means for reciprocating the mandrel axially relative to the frame to engage a metallic insert in said passage and to carry and drive the insert into a workpiece supported on the bed, and mechanism for moving the insert-receiving member toward the workpiece before each insert is thus driven into the workpiece, to increase the length of time during which the insert remains in thermal contact with the insert-receiving member.

2. Apparatus according to claim 1 wherein the insert-rceiving member comprises a first section in which said passage is provided and a second section in direct thermal contact with the heating means, said first and second sections being releasably interconnected in good thermal conducting realtionship.

3. Apparatus according to claim 1 wherein said passage terminates in a portion of reducing cross-section having radially-elastically-deformable walls whereby resistance to displacement of inserts out of the passage obtains adjacent the exit end of said passage.

4. Apparatus according to claim 1 wherein the insert-receiving member has an insert supply passage which intersects the first-mentioned passage at an angle.

5. Apparatus according to claim 1 wheren the mechanism for moving the insert-receiving member comprises a spring acting between said member and the frame, urging said member forward, an abutment connected to the mandrel against which said member is urged by the spring, and a stop on the frame which limits forward movement of said member.

6. Apparatus according to claim 5 wherein said stop is engageable by an abutment on said member which is adjustable to determine the stroke of said member.

* * * * *